United States Patent
Tanaka

(10) Patent No.: US 8,221,145 B2
(45) Date of Patent: Jul. 17, 2012

(54) LAMP SOCKET AND LIQUID CRYSTAL MODULE

(75) Inventor: Mitsuru Tanaka, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 12/969,623

(22) Filed: Dec. 16, 2010

(65) Prior Publication Data

US 2011/0151697 A1   Jun. 23, 2011

(30) Foreign Application Priority Data

Dec. 22, 2009   (JP) ................................ 2009-290585

(51) Int. Cl.
*H01R 33/08*   (2006.01)
(52) U.S. Cl. ........................................ 439/226
(58) Field of Classification Search .................. 439/226, 439/234, 235, 225; 362/260, 634, 97.2, 217.14, 362/377
See application file for complete search history.

(56) References Cited

U.S. PATENT DOCUMENTS

| | | | |
|---|---|---|---|
| 7,452,102 B2 * | 11/2008 | Ryu | 362/225 |
| 2008/0055916 A1 * | 3/2008 | Chen et al. | 362/377 |
| 2008/0079865 A1 * | 4/2008 | Kang et al. | 349/61 |
| 2008/0139008 A1 * | 6/2008 | Lee et al. | 439/58 |
| 2009/0079897 A1 * | 3/2009 | Sakuma | 349/58 |

FOREIGN PATENT DOCUMENTS

| | | |
|---|---|---|
| EP | 1 921 493 A2 | 5/2008 |
| EP | 2 071 233 A1 | 6/2009 |
| JP | 2001-6426 A | 1/2001 |
| JP | 2006-253116 A | 9/2006 |
| JP | 2006-318841 A | 11/2006 |

OTHER PUBLICATIONS

European Search Report of corresponding EP Application No. 10 19 6062.3 dated May 2, 2011.

* cited by examiner

*Primary Examiner* — Alexander Gilman
(74) *Attorney, Agent, or Firm* — Global IP Counselors

(57) ABSTRACT

A lamp socket includes a socket body, first and second lamp support components and first and second wire support components. The socket body has a wiring through-hole that is disposed at a middle part of the socket body in a longitudinal direction of the socket body. The first and second lamp support components are disposed at end parts of the socket body in the longitudinal direction of the socket body, respectively. The first and second wire support components are disposed between the first and second lamp support components. The first wire support component has a first upper face that longitudinally extends between the first lamp support component and the wiring through-hole. The second wire support component has a second upper face that longitudinally extends between the second lamp support component and the wiring through-hole.

11 Claims, 4 Drawing Sheets

LAMP SOCKET AND LIQUID CRYSTAL MODULE

CROSS-REFERENCE TO RELATED APPLICATIONS

This application claims priority to Japanese Patent Application No. 2009-290585 filed on Dec. 22, 2009. The entire disclosure of Japanese Patent Application No. 2009-290585 is hereby incorporated herein by reference.

BACKGROUND

1. Field of the Invention

The present invention generally relates to a lamp socket. More specifically, the present invention relates to a lamp socket that is attached to a U-shaped cold cathode tube.

2. Background Information

A conventional lamp socket is attached to both ends of a U-shaped cold cathode tube inside a liquid crystal module. The lamp socket has a pair of left and right supporting concave components. The left and right supporting concave components hold and support the two ends of the U-shaped cold cathode tube. The left and right supporting concave components are formed at both ends of the lamp socket. Holes are formed on the bottoms of the left and right supporting concave components, respectively. Two lamp wires connected with solder to pin terminals of the U-shaped cold cathode tube are pulled out below the lamp socket through the holes, respectively.

Meanwhile, there is a conventional liquid crystal-use backlight. With the liquid crystal-use backlight, wiring is connected substantially vertically to both ends of a cold cathode tube. These connections are covered with lamp sockets that have a substantially L-shaped exterior and are hollow in their interior. Notches are provided along a center axis direction of the cold cathode tube from a mouth of a hole on the cold cathode tube side of the lamp sockets. With the lamp sockets, load can be reliably reduced when the lamp sockets are mounted to the connections between the cold cathode tube and the wiring (see Japanese Laid-Open Patent Application Publication No. 2006-318841, for example).

There is also a known cold cathode discharge lamp device. With the lamp device, two ends of a cold cathode discharge lamp are supported in support holes of a pair of holder/sockets equipped with lead wires. A temperature sensor is disposed at an outer peripheral part of the cold cathode discharge lamp near at least one of the holder/sockets, and sensor-use lead wires are guided out from the holder/sockets (see Japanese Laid-Open Patent Application Publication No. 2001-6426, for example).

SUMMARY

It has been discovered that, with the conventional lamp sockets, since the lamp wires connected by the solder to the pin terminals at both ends of the U-shaped cold cathode tube are taken out below the sockets in a state of hanging down from the holes, and are connected to a connector, so if the connector or the lamp wires are pulled hard during assembly work, the solder can come loose and result in a bad connection, or the U-shaped cold cathode tube may not light up or may cause a fire, among other such problems. Furthermore, the work of soldering the lamp wires to the pin terminals of the U-shaped cold cathode tube has to be performed in a state in which the lamp wires have been inserted through the holes in the lamp sockets, so a problem is that the work is more difficult.

Furthermore, it has been discovered that, with the conventional liquid crystal-use backlight, since the wiring is soldered substantially vertically to the two ends of the cold cathode tube, and the wiring is taken out below the socket in a state of hanging down from the bottom of the lamp socket, so the wiring is subject to strong tensile force, which poses the risk that loose solder will result in a bad connection, or the cold cathode tube will not light up or will ignite. Also, since the connecting work has to be performed in a state in which the wiring has been inserted through the lamp socket, a problem is that the work is not easy.

Moreover, it has also been discovered that, with the conventional cold cathode discharge lamp device, since the lead wires are connected substantially at a right angle to the terminals at both ends of the cold cathode discharge lamp device, and the lead wires are taken out below the socket in a state of hanging down from the bottoms of the holder/sockets, the same problems as mentioned above are encountered.

An improved lamp socket was conceived in light of the above-mentioned problem. One object of the present disclosure is to provide a lamp socket with which, even when a strong tensile force is exerted on a lamp wire that is connected to a pin terminal of a U-shaped cold cathode tube, the connection is prevented from coming loose.

In accordance with one aspect of the present disclosure, a lamp socket includes a socket body, first and second lamp support components and first and second wire support components. The socket body has a wiring through-hole that is disposed at a middle part of the socket body in a longitudinal direction of the socket body. The wiring through-hole communicates an upper side of the socket body with a lower side of the socket body. The first and second lamp support components are disposed at end parts of the socket body in the longitudinal direction of the socket body, respectively. The first and second lamp support components extend in a lateral direction that is perpendicular to the longitudinal direction of the socket body. The first and second wire support components are disposed between the first and second lamp support components. The first wire support component has a first upper face that longitudinally extends between the first lamp support component and the wiring through-hole. The second wire support component has a second upper face that longitudinally extends between the second lamp support component and the wiring through-hole.

With the lamp socket, it is possible to provide a lamp socket with which, even when a strong tensile force is exerted on a lamp wire that is connected to a pin terminal of a U-shaped cold cathode tube, the connection is prevented from coming loose.

These and other objects, features, aspects and advantages will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure.

DETAILED DESCRIPTION OF EMBODIMENTS

A preferred embodiment will now be explained with reference to the drawings. It will be apparent to those skilled in the art from these disclosures that the following descriptions of the preferred embodiment are provided for illustration only and not for the purpose of limiting the invention as defined by the appended claims and their equivalents.

Figure 1:
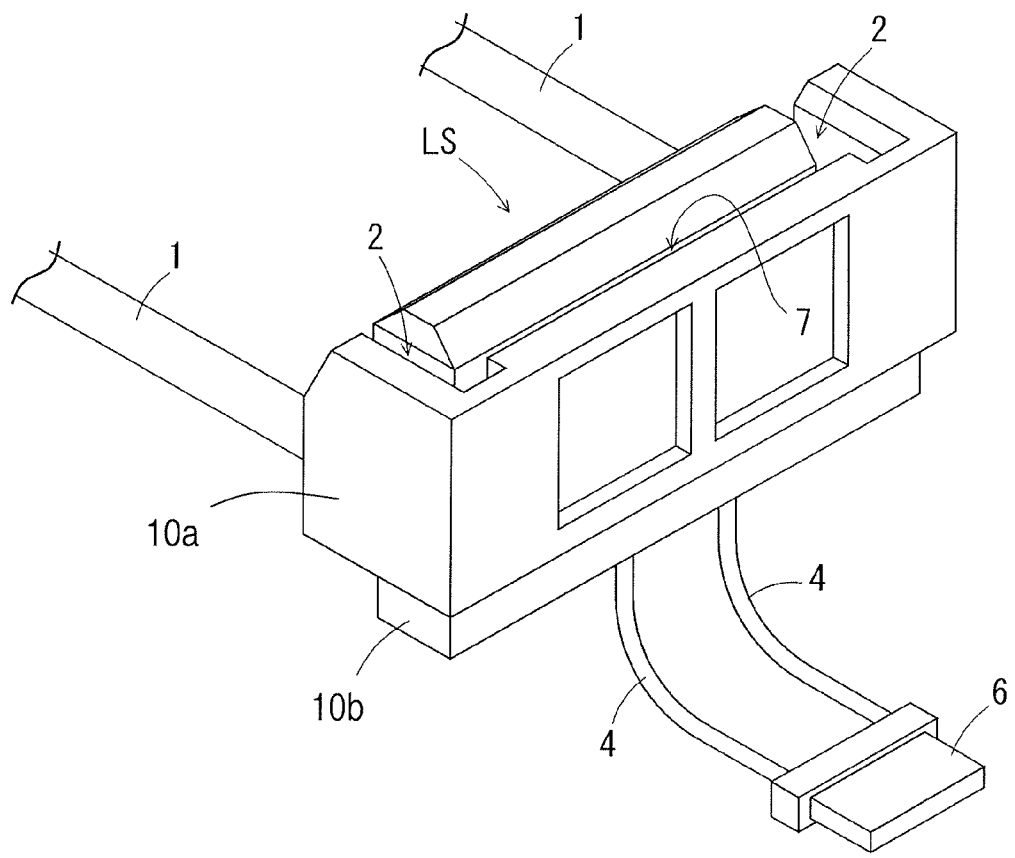
FIG. 1 is an enlarged, partial perspective view of a lamp socket that is attached to a U-shaped cathode tube in accordance with one embodiment.
Figure 5:
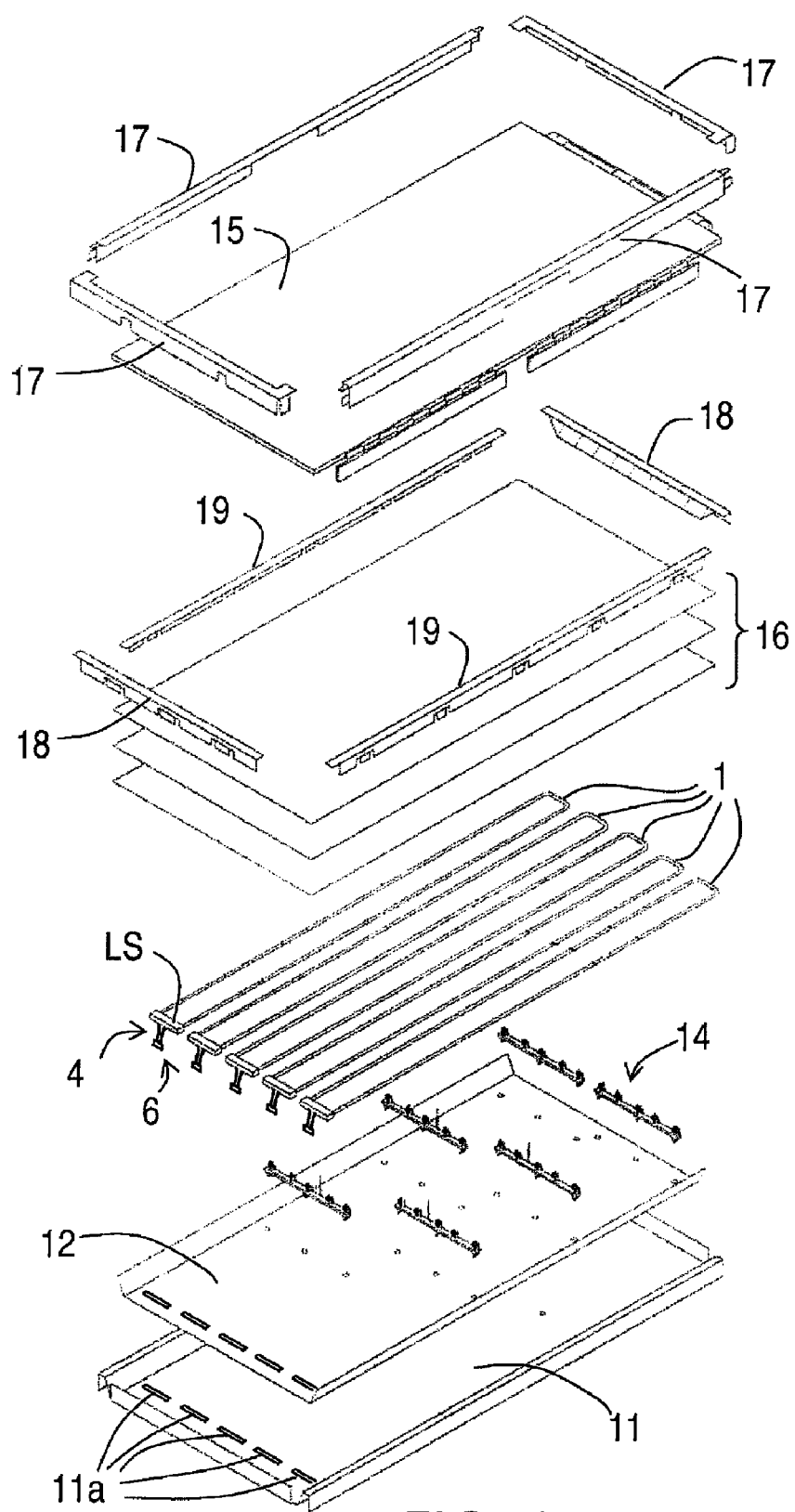
FIG. 5 is an exploded perspective view of a liquid crystal module in accordance with one embodiment.

As seen in FIGS. 1 and 5, a liquid crystal module basically includes a plurality of U-shaped cold cathode tubes 1, a plurality of lamp wires 4, a plurality of connectors 6, a plurality of lamp sockets LS, a rear frame 11, a light reflecting sheet 12, a plurality of lamp holders 14, a liquid crystal panel 15, a plurality of optical sheets 16, a plurality of bezels 17, a pair of left and right lamp frames 18, and a pair of bezel guides 19. A liquid crystal module is a large module that is installed in a wide-screen liquid crystal television set, personal computers and other electronic devices.

Figure 2:
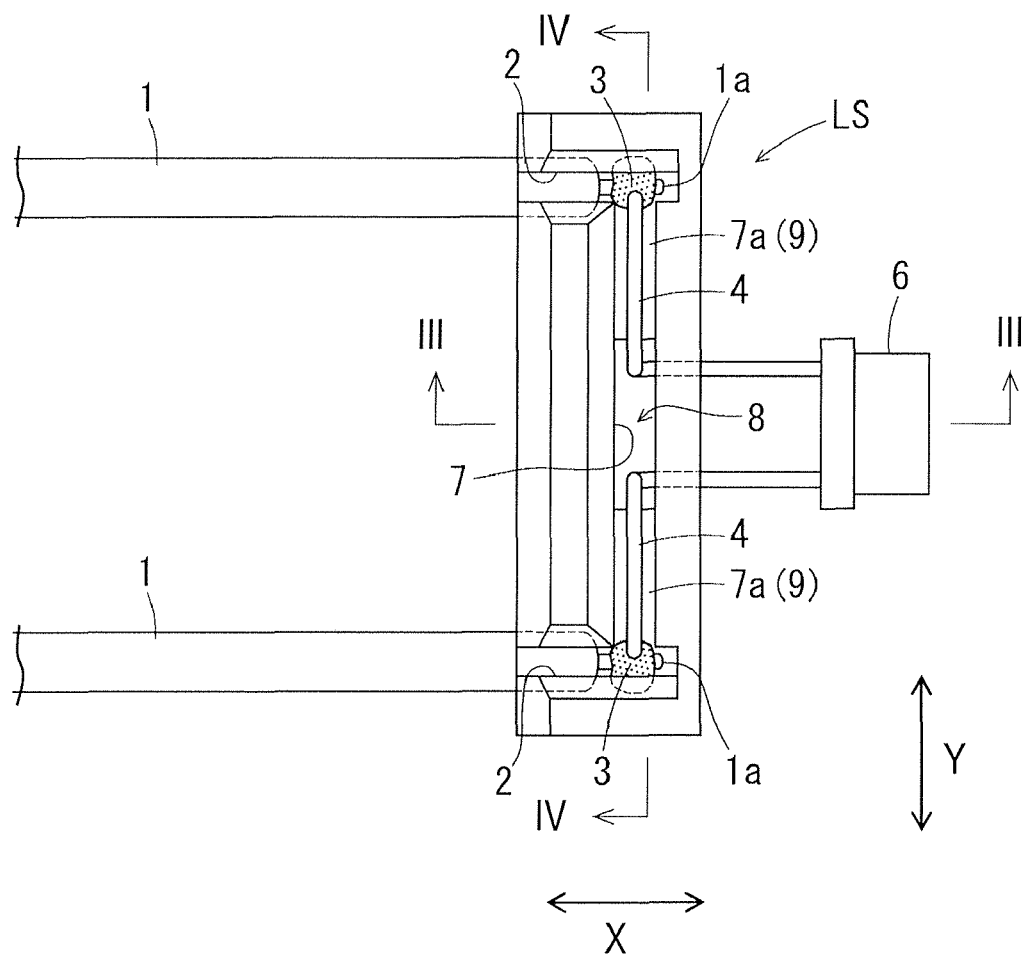
FIG. 2 is an enlarged, partial front elevational view of the lamp socket illustrated in FIG. 1.
Figure 3:
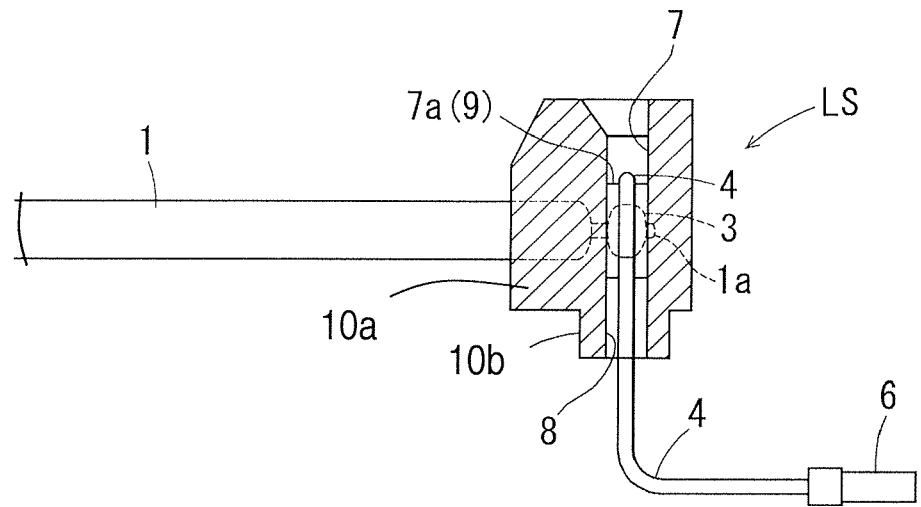
FIG. 3 is a cross sectional view of the lamp socket taken along line in FIG. 2.

As seen in FIG. 2, each of the U-shaped cold cathode tubes 1 has two pin terminals 1a at both ends (e.g., distal end portions) of each of the U-shaped cold cathode tubes 1. The term "U-shaped cold cathode tube" used here encompasses not only a single cold cathode tube that has been bent in a U shape, but also what is known as a "semi-U-shaped cold cathode tube" in which two straight cold cathode tubes are lined up in parallel and pin terminals at one end of these are connected with a connecting plate.

The lamp wires 4 are fixedly and electrically coupled to the pin terminals 1a of each of the U-shaped cold cathode tubes 1, respectively. In particular, the lamp wires 4 (e.g., one end portions of the lamp wires 4) are soldered to the pin terminals 1a, respectively. The two lamp wires 4 (e.g., the other end portions of the lamp wires) are also fixedly and electrically coupled to the connector 6. The connectors 6 are electrically coupled to an electric power supply (not shown), and supply electric power to the U-shaped cold cathode tubes 1 via the lamp wires 4. The rear frame 11 is made of sheet metal. The rear frame 11 has a shallow box shape. The light reflecting sheet 12 is provided on an inside of the rear frame 11. The U-shaped cold cathode tubes 1 are arranged on the light reflecting sheet 12 within the rear frame 11, and are supported by the lamp holders 14. The optical sheets 16 are disposed above the U-shaped cold cathode tubes 1. Furthermore, the liquid crystal panel 15 is disposed above the optical sheets 16. The liquid crystal module is a direct backlit type liquid crystal module. The edges of the optical sheets 16 are placed on top faces of top and bottom side plates of the rear frame 11, and are held down by the pair of bezel guides 19 attached to the top and bottom side plates. The four edges of the liquid crystal panel 15 are placed over the bezel guides 19 and the left and right lamp frames 18, and are held down and fixed by four bezels 17.

Figure 4:
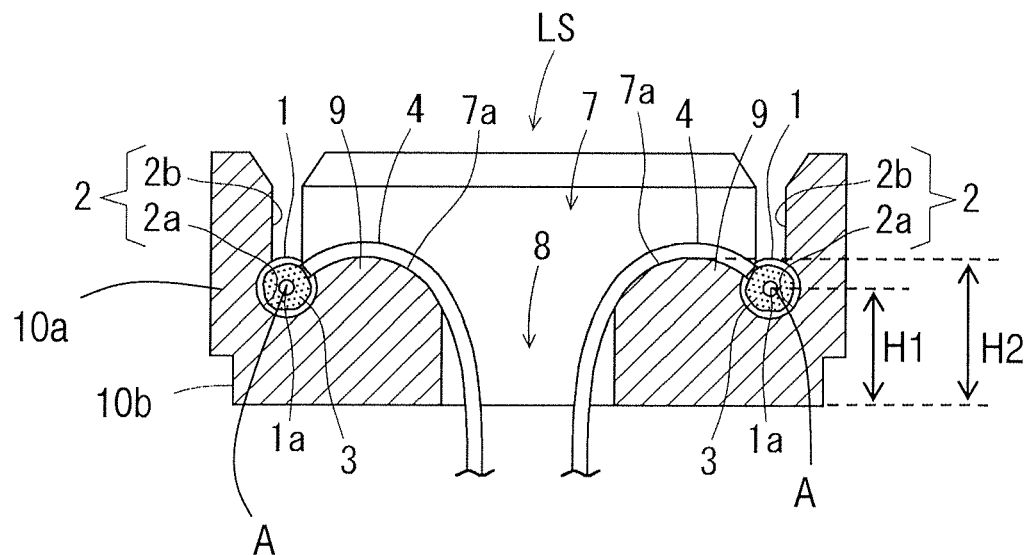
FIG. 4 is a cross sectional view of the lamp socket taken along Iv-IV line in FIG. 2.

Referring to FIGS. 1 to 4, the lamp sockets LS will be discussed in detail. The lamp sockets LS are identical with each other. The lamp socket LS is made of a synthetic rubber, synthetic resin, or other such elastomer that is elastic and has a, high coefficient of friction. The lamp socket LS is integrally foamed as one-piece, unitary member. The lamp socket LS has a socket body 10a and a fitting leg 10b. The lamp socket LS also includes a pair of supporting concave components (e.g., first and second lamp support components) 2. The supporting concave components 2 are formed at longitudinal end portions (e.g., end parts) of the lamp socket LS in a longitudinal direction Y of the lamp socket LS, respectively. The supporting concave components 2 hold and support both ends of the U-shaped cold cathode tube 1, respectively. As seen in FIG. 4, each of the supporting concave components 2 has a circular hollow cylinder 2a and a narrow slit 2b. The circular hollow cylinders (e.g., first and second hollow portions) 2a extends in a lateral direction X of the lamp socket LS, respectively. The lateral direction X is perpendicular to the longitudinal direction Y. The slit 2b has a narrow width that is less than the diameter of the circular hollow cylinder 2a. The silt 2b is formed integrally on an upper side of the circular hollow cylinder 2a. While the slits 2b are pushed open, the two ends of the U-shaped cold cathode tube 1 are fitted from above to the circular hollow cylinders 2a along with the pin terminals 1a that have been connected with solder 3 to the lamp wires 4. This allows the U-shaped cold cathode tube 1 to be held and supported in the lamp socket LS in a single operation.

As seen in FIG. 2, the lamp socket LS further has a communicating groove 7 formed on an upper face of the lamp socket LS, and a vertical through-hole (e.g., wiring through-hole) 8. The communicating groove 7 longitudinally extends between the supporting concave components 2 in the longitudinal direction Y of the lamp socket LS, and allows the supporting concave components 2 to communicate with each other via the communicating groove 7 within the lamp socket LS. As seen in FIGS. 2 and 4, the through-hole 8 has a rectangular opening through which the lamp wires 4 and the connector 6 at the distal ends of the lamp wires 4 are taken out below the lamp socket LS. The through-hole 8 is formed in a groove bottom face in a middle part of the communicating groove 7. In other words, the through-hole 8 is formed in a middle part of the lamp socket LS in the longitudinal direction Y of the lamp socket LS.

As seen in FIG. 4, the lamp socket LS also has a pair of wire support components (e.g., first and second wire support components) 9. The wire support components 9 support from below the two lamp wires 4 connected by solder 3 to the pin terminals 1a of the U-shaped cold cathode tube 1, respectively. The wire support components 9 are formed inside of (or between) the supporting concave components 2, respectively. The wire support components 9 are formed by raising up groove bottom faces (e.g., first and second upper faces) 7a of the communicating groove 7 formed on both sides of the through-hole 8, respectively. In other words, the groove bottom faces 7a on both sides of the through-hole 8 in the communicating groove 7 are formed as convex curved surfaces that upwardly convex toward the upper side of the lamp socket LS. The groove bottom faces 7a extends from upper edge portions of the through-hole 8 to the supporting concave components 2, respectively. Therefore, as seen in FIG. 4, center axes A of the circular hollow cylinders 2a are located lower than uppermost portions of the groove bottom faces 7a. In other words, the heights H1 of the center axes A relative to a bottom portion of the lamp socket LS are smaller than the heights H2 of the upper most portions of the groove bottom faces 7a. The through-hole 8 is formed in a middle part of the lamp socket LS between the wire support components 9. The wire support components 9 allow the lamp wires 4 to be taken out below the lam socket LS from the through-hole 8 while bending in an arc shape along the convex curved support surfaces (i.e., the groove bottom faces 7a) of the wire support components 9.

The fitting leg 10b is formed at a lower part of the socket body 10a of the lamp socket LS. The fitting leg 10b is fitted into an attachment hole 11a formed in the rear frame 11 of the liquid crystal module, thereby attaching and fixing the lamp socket LS to the rear frame 11. Furthermore, the fitting leg 10b allows the lamp wires 4 and the connector 6 coupled at the distal ends of the lamp wires 4 to be taken out to the back of the rear frame 11.

With the lamp socket LS, the two ends of the U-shaped cold cathode tube 1 are held and supported by the supporting concave components 2 formed at the ends of the lamp socket LS. The two lamp wires 4 are connected by the solder 3 to the pin terminals 1a at both ends of the U-shaped cold cathode tube 1, and are fitted into the communicating groove 7. The lamp wires 4 are supported from the lower side by the convex curved support surfaces of the wire support components 9 (i.e., the groove bottom faces 7a on both sides of the through-hole 8 in the communicating groove 7). The lamp wires 4 curve in a gentle arc shape along the groove bottom faces 7a, respectively. The lamp wires 4 are taken out below the lamp socket LS from the through-hole 8 formed in the middle part of the lamp socket LS along with the connector 6 coupled at the distal ends of the lamp wires 4. With the lamp socket LS, the lamp wires 4 are supported from the lower side by the wire support components 9 until they are taken out below the lamp socket LS from the through-hole 8 in the middle part of the lamp socket LS. Even if a strong tensile force acts on the lamp wires 4, the tensile force acting on the soldered connections between the lamp wires 4 and the pin terminals 1a will be greatly reduced by frictional resistance between the lamp wires 4 and the support faces (i.e., groove bottom faces 7a) of the wire support components 9, and by frictional resistance between the lamp wires 4 and the edge portions of the upper openings of the through-hole 8. Thus, the solder 3 will not come loose and cause a bad connection. As a result, the problems, such as the U-shaped cold cathode tube 1 igniting or not lighting up due to a bad connection, can be prevented.

In particular, with the lamp socket LS, the wire support components 9 have the convex curved support surfaces by forming the groove bottom faces 7a on both sides of the through-hole 8 in the communicating groove 7 as convex curved surfaces. Thus, the contact distance between the lamp wires 4 and the convex curved support surfaces (i.e., groove bottom faces 7a) of the wire support components 9 can be made longer. Therefore, the lamp wires 4 are pressed against the convex curved support surfaces (i.e., groove bottom faces 7a) of the wire support components 9 when downward tensile force acts on the lamp wires 4, which increases the frictional resistance between the lamp wires 4 and the convex curved support surfaces. As a result, even less tensile force acts on the soldered connections between the lamp wires 4 and the pin terminals 1a even when downward tensile force acts on the lamp wires 4.

Also, with this lamp socket LS, the lamp wires 4 are preconnected with the solder 3 to the pin terminals 1a on both ends of the U-shaped cold cathode tube 1 before the soldered connections are installed into the lamp socket LS. The ends of the U-shaped cold cathode tube 1 are installed and supported in the supporting concave components 2 at both socket ends in a state in which the lamp wires 4 and the connector 6 at the distal ends thereof have been turned to face upward (or extend upward). Then, the lamp wires 4 and the connector 6 at their distal ends are taken out from above through the through-hole 8 in the middle part of the lamp socket LS to below the lamp socket LS. Thus, the soldering work is much easier than when lamp wires are passed through holes of lamp socket before being soldered to pin terminals, as with a conventional lamp socket because the soldering work can be done before the lamp wires 4 are disposed through the through-hole 8. Furthermore, the lamp wires 4 are coupled to the connector 6 before the lamp wires 4 are disposed through the through-hole 8. Moreover, with this lamp socket LS, the communicating groove 7 that allows communication between the supporting concave components 2 are formed in the upper part of the lamp socket LS. Furthermore, the through-hole 8 are formed in the middle part of the groove bottom faces 7a of the communicating groove 7, and the groove bottom faces 7a on both sides of the through-hole 8 are used as the support faces for the lamp wire. Since the lamp wires 4 can be fitted into and pass through the communicating groove 7, they are not exposed at the top of the lamp socket LS, making the lamp wires 4 tidier.

With the lamp socket LS, the width of the communicating groove 7 in the lateral direction X is the same as the minor diameter (e.g., the dimension of the shorter side, or dimension in the lateral direction X) of the through-hole 8. However, the groove width on both sides of the through-hole 8 in the communicating groove 7 can be set to be the same as or slightly smaller than the gauge of the lamp wires 4. With this arrangement, the lamp wires 4 are flanked by the side walls of the communicating groove 7. If this is done, then there will be frictional resistance between the lamp wires 4 and the side walls of the communicating groove 7. Thus, an advantage is that even less tensile force will act on the soldered connections between the lamp wires 4 and the pin terminals 1a.

Furthermore, side walls sandwiching the through-hole 8 in the communicating groove 7 can be made to gently undulate or curve as viewed from the upper side of the lamp socket LS. With this arrangement, there will be an even greater increase in frictional resistance between the lamp wires 4 and the side walls of the communicating groove 7. Thus, an advantage is a marked reduction in the tensile force that acts on the soldered connections between the pin terminals 1a and the lamp wires 4.

General Interpretation of Terms

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a liquid crystal module equipped with the present invention. Accordingly, these terms, as utilized to describe the present invention should be interpreted relative to a liquid crystal module equipped with the present invention as used in the normal operating position.

While a preferred embodiment have been chosen to illustrate the present invention, it will be apparent to those skilled in the art from these disclosures that various changes and modifications can be made herein without departing from the scope of the invention as defined in the appended claims. Furthermore, the foregoing descriptions of the preferred embodiment according to the present invention are provided for illustration only, and not for the purpose of limiting the invention as defined by the appended claims and their equivalents.

What is claimed is:

1. A lamp socket comprising:
a socket body with a wiring through-hole that is disposed at a middle part of the socket body in a first direction of the socket body, the wiring through-hole communicating an upper side of the socket body with a lower side of the socket body;
first and second lamp support components disposed at end parts of the socket body in the first direction of the socket body, respectively, the first and second lamp support components extending in a second direction of the socket body, the second direction of the socket body being perpendicular to the first direction of the socket body; and
first and second wire support components disposed between the first and second lamp support components, the first wire support component having a first upper face that longitudinally extends between the first lamp support component and the wiring through-hole, the second wire support component having a second upper face that longitudinally extends between the second lamp support component and the wiring through-hole,
the first and second lamp support components having first and second hollow portions that extend in the second direction of the socket body, the first and second hollow portions being arranged such that center axes of the first and second hollow portions are located closer to the lower side of the socket body in a third direction of the socket body than uppermost portions of the first and second upper faces of the first and second wire support components, respectively, the third direction of the socket body being perpendicular to the first and second directions of the socket body.

2. The lamp socket according to claim 1, wherein
the first and second lamp support components are configured to support distal end portions of a U-shaped cold cathode tube, respectively, and
the first and second upper faces of the first and second wire support components are configured to support lamp wires along the first and second upper faces, one end portions of the lamp wires being coupled to pin terminals that are disposed at the distal end portions of the U-shaped cold cathode tube, respectively, the other end portions of the lamp wires being coupled to a connector and disposed on the lower side of the lamp socket, and middle portions of the lamp wires being disposed through the wiring through-hole.

3. The lamp socket according to claim 1, wherein
the socket body further has a communicating groove formed on an upper face of the socket body, the communicating groove longitudinally extending between the first and second lamp support components such that the first and second lamp support components communicating with each other via the communicating groove.

4. The lamp socket according to claim 3, wherein
the first and second upper faces of the first and second wire support components are located at a bottom of the communicating groove.

5. The lamp socket according to claim 1, wherein
the first and second upper faces of the first and second wire support components have convex curved surfaces that upwardly convex toward the upper side of the socket body, respectively.

6. The lamp socket according to claim 1, wherein
the first and second upper faces of the first and second wire support components face towards the upper side of the socket body.

7. A liquid crystal module comprising:
a rear frame;
a U-shaped cold cathode tube disposed within the rear frame, the U-shaped cold cathode tube having pin terminals at distal end portions of the U-shaped cold cathode tube:
a pair of lamp wires coupled to the pin terminals of the U-shaped cold cathode tube at one end portions of the lamp wires, respectively;
a connector coupled to the other end portions of the lamp wires;
a liquid crystal panel disposed above the U-shaped cold cathode tube; and
a lamp socket coupled to the rear frame and supporting the U-shaped cold cathode tube relative to the rear frame, the lamp socket including
a socket body coupled to the rear frame, the socket body having a wiring through-hole that is disposed at a middle part of the socket body in a first direction of the socket body, the wiring through-hole communicating an upper side of the socket body with a lower side of the socket body, with middle portions of the lamp wires being disposed through the wiring through-hole such that the other end portions of the lamp wires and the connector are disposed on the lower side of the socket body,
first and second lamp support components disposed at end parts of the socket body in the first direction of the socket body, respectively, the first and second lamp support components extending in a second direction of the socket body, the second direction of the socket body being perpendicular to the first direction of the socket body, the first and second lamp support components supporting the distal end portions of the U-shaped cold cathode tube, respectively, and
first and second wire support components disposed between the first and second lamp support components, the first wire support component having a first upper face that longitudinally extends between the first lamp support component and the wiring throughhole, the second wire support component having a second upper face that longitudinally extends between the second lamp support component and the wiring through-hole, the first and second upper faces of the first and second wire support components supporting the lamp wires along the first and second bottom faces,
the first and second lamp support components having first and second hollow portions that extend in the second direction of the socket body, the first and second hollow portions being arranged such that center axes of the first and second hollow portions are located closer to the lower side of the socket body in a third direction of the socket body than uppermost portions of the first and second upper faces of the first and second wire support components, respectively, the third direction of the socket body being perpendicular to the first and second directions of the socket body.

8. The liquid crystal module according to claim 7, wherein
the socket body further has a communicating groove formed on an upper face of the socket body, the communicating groove longitudinally extending between the first and second lamp support components such that the first and second lamp support components communicating with each other via the communicating groove.

9. The liquid crystal module according to claim 8, wherein
the first and second upper faces of the first and second wire support components are located at a bottom of the communicating groove.

10. The liquid crystal module according to claim 7, wherein
the first and second upper faces of the first and second wire support components have convex curved surfaces that upwardly convex toward the upper side of the socket body, respectively.

11. The liquid crystal module according to claim 7, wherein
the first and second upper faces of the first and second wire support components face towards the upper side of the socket body.

* * * * *